US010484965B2

(12) United States Patent
Tombaz et al.

(10) Patent No.: US 10,484,965 B2
(45) Date of Patent: Nov. 19, 2019

(54) METHODS AND VEHICLE, NETWORK NODE AND USER EQUIPMENT FOR ENABLING EFFICIENT PAGING (71) Applicant: Telefonaktiebolaget LM Ericsson (publ), Stockholm (SE)

(72) Inventors: Sibel Tombaz, Stockholm (SE); Harald Edquist, Stockholm (SE); Elena Fersman, Stockholm (SE); Mona Matti, Nacka (SE); Magnus Olsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/097,717

(22) PCT Filed: May 16, 2016

(86) PCT No.: PCT/SE2016/050438
§ 371 (c)(1),
(2) Date: Oct. 30, 2018

(87) PCT Pub. No.: WO2017/200430
PCT Pub. Date: Nov. 23, 2017

(65) Prior Publication Data
US 2019/0166577 A1 May 30, 2019

(51) Int. Cl.
*H04W 68/02* (2009.01)
*H04W 64/00* (2009.01)
(Continued)

(52) U.S. Cl.
CPC ............. *H04W 68/02* (2013.01); *H04W 4/40* (2018.02); *H04W 64/00* (2013.01); *H04W 76/28* (2018.02); *H04W 92/10* (2013.01); *H04W 92/18* (2013.01)

(58) Field of Classification Search
CPC ....... H04W 68/02; H04W 76/28; H04W 4/40; H04W 64/00
See application file for complete search history.

(56) References Cited

U.S. PATENT DOCUMENTS 6,151,551 A * 11/2000 Geier .................. G01S 19/17
340/425.5
9,554,415 B1 * 1/2017 Ho .................... H04W 76/14
(Continued)

FOREIGN PATENT DOCUMENTS

EP 2426960 A1 3/2012
WO WO 2008010756 A1 1/2008
(Continued)

OTHER PUBLICATIONS

International Search Report and Written Opinion of the International Searching Authority, PCT/SE2016/050438, dated Jan. 25, 2017, 12 pages.
(Continued)

*Primary Examiner* — Ernest G Tacsik
(74) *Attorney, Agent, or Firm* — Sage Patent Group (57) ABSTRACT A method and a vehicle as well as a method and a user equipment for enabling a network node to manage paging of the user equipment are disclosed. Moreover, a method and a network node for managing paging of a user equipment are disclosed. The user equipment sends, to the vehicle, an identification of the user equipment by use of a direct wireless communication connection. Then, the vehicle sends, to the network node, the identification of the user equipment. The network node sends, to the user equipment, a control message instructing the user equipment to apply a second DRX cycle, wherein the second DRX cycle is longer than a first DRX cycle. The network node also receives, from the vehicle, position information of the vehicle, whereby the network node, upon paging of the user equip-
(Continued)

ment, sends a paging message, based on the position information of the vehicle, to the user equipment. Corresponding computer programs and carriers therefor are also disclosed.

18 Claims, 5 Drawing Sheets

(51) Int. Cl.
*H04W 76/28* (2018.01)
*H04W 4/40* (2018.01)
*H04W 92/10* (2009.01)
*H04W 92/18* (2009.01)

(56) References Cited

U.S. PATENT DOCUMENTS

| | | | |
|---|---|---|---|
| 2004/0166828 A1* | 8/2004 | Yosioka | G08B 25/016 455/344 |
| 2011/0281545 A1* | 11/2011 | Murakami | G08B 25/016 455/404.1 |
| 2012/0314635 A1* | 12/2012 | Lee | H04L 5/001 370/311 |
| 2014/0343834 A1* | 11/2014 | DeMerchant | G01S 5/0027 701/300 |
| 2015/0215830 A1* | 7/2015 | Dalsgaard | H04W 36/0094 455/444 |
| 2015/0289110 A1* | 10/2015 | Kilpatrick, II | H04W 4/029 455/456.1 |
| 2015/0355703 A1 | 12/2015 | MacDonald et al. | |
| 2016/0021167 A1 | 1/2016 | Park et al. | |
| 2016/0021239 A1 | 1/2016 | Iwai | |
| 2016/0142944 A1* | 5/2016 | Cao | H04W 36/0022 |
| 2016/0183071 A1 | 6/2016 | Shinada et al. | |
| 2018/0338281 A1* | 11/2018 | Bangolae | H04W 52/0216 |

FOREIGN PATENT DOCUMENTS

| | | |
|---|---|---|
| WO | WO 2009045380 A1 | 4/2009 |
| WO | WO 2013/172672 A1 | 11/2013 |
| WO | WO 2014105190 A1 | 7/2014 |
| WO | WO 2016208954 A1 | 12/2016 |

OTHER PUBLICATIONS

Supplementary European Search Report, EP 16 90 2551, dated Apr. 12, 2019, 5 pages.

* cited by examiner

METHODS AND VEHICLE, NETWORK NODE AND USER EQUIPMENT FOR ENABLING EFFICIENT PAGING

CROSS REFERENCE TO RELATED APPLICATIONS

This application is a 35 U.S.C. § 371 national stage application of PCT International Application No. PCT/SE2016/050438 filed on May 16, 2016, the disclosure and content of which is incorporated by reference herein in its entirety.

TECHNICAL FIELD

Embodiments herein relate to connected vehicles, such as Intelligent Transportation Systems (ITS), autonomous vehicles and the like. In particular, a method and a vehicle for enabling a network node to manage paging of a user equipment as well as a method and a network node for managing paging of a user equipment are disclosed. Moreover, a method and a user equipment for enabling a network node to manage paging of the user equipment are disclosed. Corresponding computer programs and carriers therefor are also disclosed.

BACKGROUND

Connected vehicles are expected to exchange extensive amounts of control information with a wireless network serving the connected vehicles. A reason for this is that an autonomous vehicle typically needs continuously updated control information, such as positioning messages relating to its current position, in order to be safely conveyed. Furthermore, the control information includes for example paging messages, tracking area update messages, and as mentioned positioning messages. Each of these messages has its conventional meaning as used within the field of wireless networks, specifically within telecommunications. Nevertheless, in short as specific examples to improve understanding, the paging messages are sent when the wireless network initiates a session, such as a phone call or the like, with a particular wireless device, such as a smartphone, and the tracking area update messages are sent by the particular wireless device when the particular wireless device moves around in the wireless network.

A known wireless network serves a connected vehicle, being equipped with wireless communication capabilities, and a wireless device. The aforementioned control information is exchanged between the wireless network and the connected vehicle as well as between the wireless network and the wireless device. In order to provide a more sustainable and environmental friendly wireless system, including the wireless network and the wireless device, it is desired to reduce power consumption of the wireless system. According to a known manner of reducing power consumption, so called Discontinuous Reception (DRX) cycles are applied. DRX implies that the wireless device switches between periods of sleep and periods of activity. During the periods of sleep, power consumption of the wireless device is low compared to during the periods of activity. A maximum DRX cycle would imply very low power consumption. The wireless network may of course only send paging messages to the wireless device during the periods of activity. Thanks to the DRX cycle, time between charging of a battery of the wireless device is extended.

However, a maximum DRX cycle, ensuring great energy savings, would force the wireless network to find the wireless device in only one attempt, while otherwise duration until a next period of activity would be unacceptably long. This means that the wireless network has to page, i.e. send paging messages to, the wireless device in all cells of a tracking area list maintained by the wireless device. This is inefficient since many paging message needs to be transmitted in the wireless network. In order to reduce the number of paging messages, it may be possible to configure the wireless device to keep only a few cells in the tracking area list. A problem with this approach is, however, that the wireless device will be forced to send tracking area update messages or similar more often, i.e. as soon as the wireless device moves out of the few cells in the tracking area list. Oppositely, if the wireless device keeps many cells in the tracking area list, the number of paging messages will increase and the complexity of the wireless device increases.

SUMMARY

Therefore, an object may be to at least enable efficient management of paging such as e.g. to reduce power consumption.

According to an aspect, the object is achieved by a method, performed by a vehicle, for enabling a network node to manage paging of a user equipment, in a cellular radio access network. The vehicle receives, from the user equipment, an identification of the user equipment by use of a direct wireless communication connection between the vehicle and the user equipment, wherein the identification of the user equipment relates to the cellular radio access network. The vehicle sends, to the network node and via the cellular radio access network, the identification of the user equipment, whereby the network node is made aware of that position information of the vehicle is applicable to the user equipment when paging the user equipment. The vehicle sends, to the network node, the position information of the vehicle, whereby the network node, upon paging of the user equipment, sends a paging message, based on the position information of the vehicle, to the user equipment.

According to another aspect, the object is achieved by a vehicle configured for enabling a network node to manage paging of a user equipment, in a cellular radio access network. The vehicle is configured for receiving, from the user equipment, an identification of the user equipment by use of a direct wireless communication connection between the vehicle and the user equipment, wherein the identification of the user equipment relates to the cellular radio access network. Moreover, the vehicle is configured for sending, to the network node and via the cellular radio access network, the identification of the user equipment, whereby the network node is made aware of that position information of the vehicle is applicable to the user equipment when paging the user equipment. Furthermore, the vehicle is configured for sending, to the network node, the position information of the vehicle, whereby the network node, upon paging of the user equipment, sends a paging message, based on the position information of the vehicle, to the user equipment.

According to a further aspect, the object is achieved by a method, performed by a network node, for managing paging of a user equipment in a cellular radio access network, wherein the user equipment is page-able by the network node according to a first DRX cycle and based on position information of the user equipment. The network node receives, from the vehicle and via the cellular radio access network, an identification of the user equipment, wherein the identification of the user equipment relates to the cellular radio access network. The network node sends, to the user equipment, a control message instructing the user equipment to apply a second DRX cycle, wherein the second DRX cycle is longer than the first DRX cycle. The network node receives, from the vehicle, position information of the vehicle. The network node sends, based the position information of the vehicle, a paging message to the user equipment.

According to a still further aspect, the object is achieved by a network node configured for managing paging of a user equipment in a cellular radio access network, wherein the user equipment is page-able by the network node according to a first DRX cycle and based on position information of the user equipment. The network node is configured for receiving, from the vehicle and via the cellular radio access network, an identification of the user equipment, wherein the identification of the user equipment relates to the cellular radio access network. Moreover, the network node is configured for sending, to the user equipment, a control message instructing the user equipment to apply a second DRX cycle, wherein the second DRX cycle is longer than the first DRX cycle. Furthermore, the network node is configured for receiving, from the vehicle, position information of the vehicle. The network node is also configured for sending, based the position information of the vehicle, a paging message to the user equipment.

According to yet another aspect, the object is achieved by a method, performed by a user equipment, for enabling a vehicle to enable a network node to manage paging of the user equipment in a cellular radio access network, wherein the user equipment is page-able by the network node according to a first DRX cycle. The user equipment sends, to the vehicle, an identification of the user equipment by use of a direct wireless communication connection, wherein the identification of the user equipment relates to the cellular radio access network. The user equipment receives, from the network node, a control message, instructing the user equipment to apply a second DRX cycle, wherein the second DRX cycle is longer than the first DRX cycle.

According to a yet further aspect, the object is achieved by a user equipment configured for enabling a vehicle to enable a network node to manage paging of the user equipment in a cellular radio access network, wherein the user equipment is page-able by the network node according to a first DRX cycle. The user equipment is configured for sending, to the vehicle, an identification of the user equipment by use of a direct wireless communication connection, wherein the identification of the user equipment relates to the cellular radio access network. Moreover, the user equipment is configured for receiving, from the network node, a control message, instructing the user equipment to apply a second DRX cycle, wherein the second DRX cycle is longer than the first DRX cycle.

According to further aspects, the object is achieved by computer programs and carriers therefor corresponding to the aspects above.

Thanks to that the network node receives, from the vehicle and via the cellular radio access network, the identification of the user equipment, the network node is made aware of that position information of the vehicle can be applied to, e.g. used as valid for, the user equipment when paging the user equipment. Hence, when the vehicle has sent, to the network node, the position information of the vehicle, the network node sends, when about to page the user equipment, a paging message to the user equipment. The sending of the paging message is performed based on, e.g. while taking into account, the position information of the vehicle.

Power consumption of the user equipment may for example be reduced when the network node instructs, e.g. by means of the control message, the user equipment to apply the second DRX cycle, i.e. longer DRX cycles. As is known in the art, a DRX cycle refers to a period in which the user equipment is allowed to shut down e.g. radio circuitry to reduce power consumption. This is possible since the network node receives position information of the vehicle, wherein the position information of the vehicle is used by the network node to continue to e.g. keep track of a position of the user equipment. As long as an association of the user equipment with the vehicle remains, the position of the user equipment is equal to, or essentially equal to, a position of the vehicle.

Power consumption of the network node may for example be reduced when the network node uses the position information of the vehicle when paging the user equipment. In more detail, this means that the network node may advantageously page the user equipment at a position of the vehicle, or in an area in which the vehicle is located. Such area is sometimes referred to as tracking area, location area or the like. The network node may thus accurately, i.e. in only a few cells or tracking areas, page the user equipment despite the fact that the user equipment do not frequently report its position, such as by means of a tracking area update message or the like.

As described above, the embodiments herein provides a possibility to reduce non-data related transmission, such as tracking area update message, paging message and the like, between a UE in the vehicle and the network node by utilizing the position information of the vehicle. In this manner, energy consumption of the network may be reduced and battery-life of the user equipment may be extended.

An advantage, at least according to some embodiments, is that the user equipment may increase the Discontinuous Reception (DRX) duration and/or decrease the non-active "on duration". In this manner, power consumption of the user equipment is decreased.

Another advantage, at least according to some embodiments, is that the network may reduce its overhead from non-data related transmissions, such as paging messages, due to more accurate knowledge about position of the user equipment by use of the position information of the vehicle.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 1:
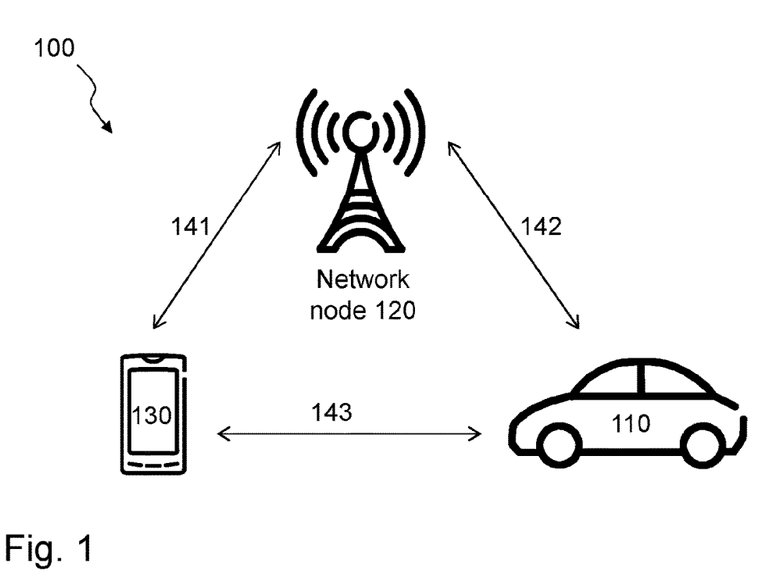
FIG. 1 is a schematic overview of an exemplifying wireless system in which embodiments herein may be implemented.

FIG. 1 depicts an exemplifying wireless system 100 in which embodiments herein may be implemented. In this example, the wireless system 100 is any cellular or wireless communication system, such as a Long Term Evolution (LTE), Universal Mobile Telecommunication System (UMTS) and Worldwide Interoperability for Microwave Access (WiMAX), Global System for Mobile communication (GSM) system or the like.

The wireless system 100 may be said to comprise a vehicle 110, such as a connected vehicle, a connected car, a connected train, a connected bus, a connected lorry, a connected heavy vehicle or the like. The connected vehicle 110 may, from a perspective of the wireless system 100, appear and act similarly to a wireless device, such as a cellular phone, capable of being connected to the wireless system 100. It may be that the connected vehicle 110 has a property identifying it as being capable of hosting other wireless devices. Here, "hosting" may mean that the connected vehicle 110 may allow the other wireless devices to enter the connected vehicle 110, or may allow the other wireless devices to be transported by the connected vehicle 110. The vehicle 110 may move around or it may be stationary.

The wireless system 100 further comprises a network node 120, which may serve the vehicle 110. The network node 120 may be a radio network node, i.e. an evolved Node B (eNB) in case of LTE, a base station, a radio network node, a Mobility Management Entity (MME) or the like.

Moreover, a user equipment 130 is located in the wireless system 100. Accordingly, this means that the wireless system 100 may also be said to comprise the user equipment 130. The user equipment 130 may be in-active, or idle, with respect to the network node 120. This means that the user equipment 130 has no current and ongoing session, such as a phone call. As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. Sometimes, the term "user" may be used to refer to the user equipment or the like as above. It shall be understood that the user may not necessarily involve a human user. The term "user" may also refer to a machine, a software component or the like using certain functions, methods and similar.

The network node 120 may communicate 141, e.g. by means of a cellular radio access connection, with the user equipment 130. This communication may include user transmissions and/or control transmissions. The user transmissions may include user data, payload data, content data etc. The control transmissions may include control information relating to e.g. scheduling, authentication, mobility, power control etc. as disclosed herein. The communication 141 may include uplink transmission and/or downlink transmission.

The network node 120 may communicate 142, e.g. by means of the cellular radio access connection, with the vehicle 110. This communication may include user transmissions and/or control transmissions. The user transmissions may include user data, payload data, content data etc. The control transmissions may include control information relating to e.g. scheduling, authentication, mobility, power control etc. as disclosed herein. The communication 142 may include uplink transmission and/or downlink transmission.

The vehicle 110 and the user equipment 130 may communicate 143 with each other, e.g. by means of a direct wireless connection there between. As an example, the direct wireless connection may be achieved by means of Bluetooth technology, Near Field Communication technology, WiFi or another device-to-device technology.

According to the embodiments herein, the network node 120 advantageously makes use of information concerning the vehicle 110 when handling the user equipment 130, which has been associated with the vehicle 110 as explained below.

Power consumption of the user equipment 130, e.g. in RRC_IDLE state in case of an LTE system, may be reduced thanks to that a so called DRX cycle of the user equipment 130 may be increased. That is to say, the larger the DRX cycle is, the more power saving in the user equipment 130 will be obtained. The DRX cycle may be allowed to be increased, since the network node 120 still obtains accurate information about e.g. the position, or location, of the user equipment 130 from the vehicle 110 with which the user equipment 130 is associated.

In some examples, power consumption of the wireless system 100, represented by one or more network nodes, such as the network node 120, may be reduced thanks to that the wireless system 100 may e.g. page the user equipment 130 in few cells, or even in only one cell, or tracking area. This means that at most a few cells, aka network nodes, need to transmit paging messages towards the user equipment 130. Thereby, power consumption of the wireless system 100 is reduced. The network node 120 is able to page the user equipment 130 in few cells, or tracking areas, since the network node 120 has accurate information, as obtained from the vehicle 110, about the position, or location, of the user equipment 130.

The above mentioned embodiments, and other embodiments, will now be described with reference to FIG. 2, which illustrates an exemplifying method according to the embodiments herein when implemented in the wireless system 100 of FIG. 1. The vehicle 110 performs a method for enabling the network node 120 to manage paging of the user equipment 130. The network node 120 performs a method for managing paging of the user equipment 130. The user equipment 130 performs a method for enabling the vehicle 110 to enable the network node 120 to manage paging of the user equipment 130. The user equipment 130 is page-able by the network node 120 according to a first DRX cycle and/or based on position information of the user equipment 130.

The position information of the vehicle 110 may comprise a tracking area update request, a location area update request or the like.

One or more of the following actions may be performed in any suitable order.

Action A010

A direct wireless connection is established, e.g. on initiative of the vehicle 110 or the user equipment 130. In this manner, the user equipment 130 and/or the vehicle 110 may obtain the direct wireless connection between the vehicle 110 and the user equipment 130.

Action A020

By use of the direct wireless communication connection, the user equipment 130 sends, to the vehicle 110, an identification of the user equipment 130. The identification of the user equipment 130 relates to the cellular radio access network 100. In more detail, the identification of the user equipment 130 may be an International Mobile Equipment Identity (IMEI), an International Mobile Subscriber Identity (IMSI), a Temporary Mobile Subscribe Identity (TMSI) or the like.

In this manner, the vehicle 110 is made aware of that the user equipment 130 is expected to follow movements of the vehicle 110. As a result, the user equipment 130 may be allowed to send position information less frequent than otherwise as will be apparent from the description below.

Action A030

Subsequent to action A020, the vehicle 110 receives, from the user equipment 130, the identification of the user equipment 130 by use of the direct wireless communication connection. Accordingly, the vehicle 110 may draw the conclusion that the user equipment 130 will likely follow movements of the vehicle 110.

Action A040

The vehicle 110 may store information related to the identification of the user equipment 130. The information related to the identification of the user equipment 130 may be the identification of the user equipment 130 itself and/or a value related thereto.

As an example, the value may be a random number that is mapped to the identification of the user equipment 130. Thanks to that the vehicle 110 has stored the information related to the identification of the user equipment 130, i.e. at least the identification of the user equipment 130 and optionally the value, the vehicle 110 is able to keep track of whether or not it has previously reported a particular user equipment, such as the user equipment 130, to the network node 120 as in action A050 below. In this manner, it is made possible for the vehicle 110 to detect when the user equipment 130 no longer follows movements of the vehicle 110, as in action A130 below.

Action A050

Thus, in order to also make the network node 120 aware of that the user equipment 130 may follow the movements of the vehicle 110, the vehicle 110 sends, to the network node 120 and via the cellular radio access network 100, the identification of the user equipment 130. As a consequence, the network node 120 is made aware of that position information of the vehicle 110 is applicable to the user equipment 130 when paging the user equipment 130. This action may be performed before or after action A040, but after action A030.

The identification of the user equipment 130 may be accompanied by the value that the vehicle 110 has mapped to the identification. The vehicle 110 and/or the network node 120 may store the identification and the value mapped thereto. Later, the vehicle 110 may thus send the information related to the identification of the user equipment 130, i.e. the value, to the network node 120 in order to indicate the identification of the user equipment 130. See action A040 above and A140 and A150 below.

Moreover, the identification of the user equipment 130 may be accompanied by a first indication, in order to make the network node 120 perform action A070 below. The performance of action A070 may be implicit upon the reception of the identification of the user equipment 130. Moreover, the performance of action A070 may be explicit in that the network node 120 receives the first indication which indicates to the network node 120 that action A070 shall be performed.

The first indication may further allow the network node 120 to put the user equipment 130 in a state related to the second DRX cycle.

Action A060

Subsequently to action A050, the network node 120 receives, from the vehicle 110 and via the cellular radio access network 100, the identification of the user equipment 130. The identification of the user equipment 130 relates to the cellular radio access network 100. At this stage, the network node 120 is aware of that the user equipment 130 may for example be located at the same position as the vehicle 110, or within an area covering the position of the vehicle. The network node 120 may thus associate the user equipment 130 with the vehicle 110, i.e. an association of the user equipment 130 with the vehicle 110 is created. The association may be created after reception of the identification of the user equipment 130, but before action A110. Knowing this, the network node 120 may take several measures as explained in the following.

Action A070

The network node 120 sends, to the user equipment 130, a control message instructing the user equipment 130 to apply a second DRX cycle. The second DRX cycle is longer than the first DRX cycle.

The control message may instruct the user equipment 130 to enter the state in which the second DRX cycle applied. In case of LTE, known states are for example RRC_IDLE and RRC_CONNECTED. A further state, i.e. the state above, is thus proposed. The state may be called RRC_IN_VEHICLE, RRC_SLAVE, RRC_FOLLOW, RRC_ASSOCIATED, RRC_ACCOMPANIED or the like. The state may assume the user equipment 130 to be inactive similarly to when in RRC_IDLE state, i.e. the user equipment 130 has not established a connection with the wireless system 110 and/or the network node 120.

Action A080

Following action A070, the user equipment 130 receives, from the network node 120, a control message, instructing the user equipment 130 to apply the second DRX cycle. In response to the control message, the user equipment may enter the state in which the second DRX cycle is applied.

Accordingly, the control message may imply that the user equipment 130 applies a longer DRX cycle, i.e. the second DRX cycle. In this manner, power consumption of the user equipment 130 is reduced and battery life of the user equipment 130, i.e. duration between charging thereof, is increased. The longer DRX cycle may be a so called longDRX-cycle in case of LTE. The network node 120 may thus directly set the long DRX cycle in the user equipment 130, which thus reduces its power consumption. According to prior art, it may be that transition between a short DRX cycle, and a long DRX cycle is controlled by a timer. In this embodiment, it may be that the network node 120 sends an explicit command instructing the user equipment 130 to apply the long DRX cycle in response to the reception, in action A040, of the identification of the user equipment 130.

Accordingly, these benefits have been enabled thanks to that the user equipment 130 sent the identification in action A020 above.

Due to the longer DRX cycle, the user equipment 130 will wake up and transmit/receive signals more seldom than with the first DRX cycle. As a result, the user equipment 130 will report position information less frequently, but the network node 120 will compensate for the less frequent reporting of the position information by using the position information receive from the vehicle 110 as explained in e.g. action A110.

Action A090

The vehicle 110 sends, to the network node 120, the position information of the vehicle 110. As shall be explained in action A110, the network node 120, upon paging of the user equipment 130, sends, based on the position information of the vehicle 110, a paging message to the user equipment 130.

Action A100

Subsequent to action A090, the network node 120 receives, from the vehicle 110, position information of the vehicle 110.

Action A110

Now that the network node 120 has received the position information from the vehicle 110 and paging of the user equipment 130 is about to take place, the network node 120 sends, based the position information of the vehicle 110, a paging message to the user equipment 130.

As an example, the network node 120 may thus upon paging of the user equipment 130 use the position information of the vehicle 110, such as a tracking area update message in case of LTE, in order to send the paging message only towards a tracking area in which the vehicle 110 has reported that the vehicle 110 is located. The position information of the vehicle 110 may be used directly in that the tracking area update message of the vehicle 110 may be treated as being received from the user equipment 130. Alternatively or additionally, the position information of the vehicle 110 may be used indirectly in that information, derived from the tracking area update message of the vehicle 110, is used by the network node 120 when paging the user equipment 130. Information derived from the tracking area update message may comprise a current tracking area or the like in which to page the vehicle 110 and consequently also in which to page the user equipment 130. In this manner, the network node 120 may rely on reporting from the vehicle 110 in order to enable high precision selection of cells that need to transmit paging messages in the wireless system 100.

In addition, reduction of number of paging message implies less interference towards any further user equipments in the wireless system 100.

Additionally, the network node 120 may apply information, such as trajectory, speed and location, received from the vehicle 110, in order to support decision about cell selection, and to prepare for cell re-selection pertaining to the user equipment 130.

Action A120

Following action A110, the user equipment 130 may receive the paging message from the network node 120.

Action A130

The vehicle 110 may detect a discontinuation of the direct wireless communication connection. For example, in case of Bluetooth, the vehicle 110 may detect that the user equipment 130 and the vehicle 110 are no longer communicatively connected by use of Bluetooth technology.

Action A140

In response to the discontinuation, the vehicle 110 may send, to the network node 120, information related to the identification of the user equipment 130. This means that when the vehicle 110 has detected the discontinuation, the network node 120 may perform this action. In this manner, the network node 120 is made aware of that the position information of the vehicle 110 is not applicable to the user equipment 130 when paging the user equipment 130.

Moreover, the information related to the identification of the user equipment 130 may be accompanied by a second indication, in order to make the network node 120 perform action A160 below. The performance of action A160 may be implicit upon the reception of the information related to the identification of the user equipment 130. Moreover, the performance of action A160 may be explicit in that the network node 120 receives the second indication which indicates to the network node 120 that action A160 shall be performed.

Action A150

Subsequent to action A140, the network node 120 may receive, from the vehicle 110, the information related to the identification of the user equipment 130. In this manner, the network node 120 becomes aware of that the user equipment 130 is no longer is expected to follow movements of the vehicle 110.

Action A160

As a consequence of that the user equipment 130 no longer is expected to follow the vehicle 110, the network node 120 may no longer take advantage of the position information of the vehicle 110 when paging the user equipment 130.

Thus, in this action, the network node 120 may send a further control message, instructing the user equipment 130 to apply the first DRX cycle. By means of the further control message the network node 120 may put the user equipment 130 in RCC_IDLE state as discussed above.

Action 170

Subsequent to action A160, the user equipment 130 may receive the further control message, which causes the user equipment 130 to apply the first DRX cycle, and optionally enter e.g. RCC_IDLE state as mentioned above.

Figure 2:
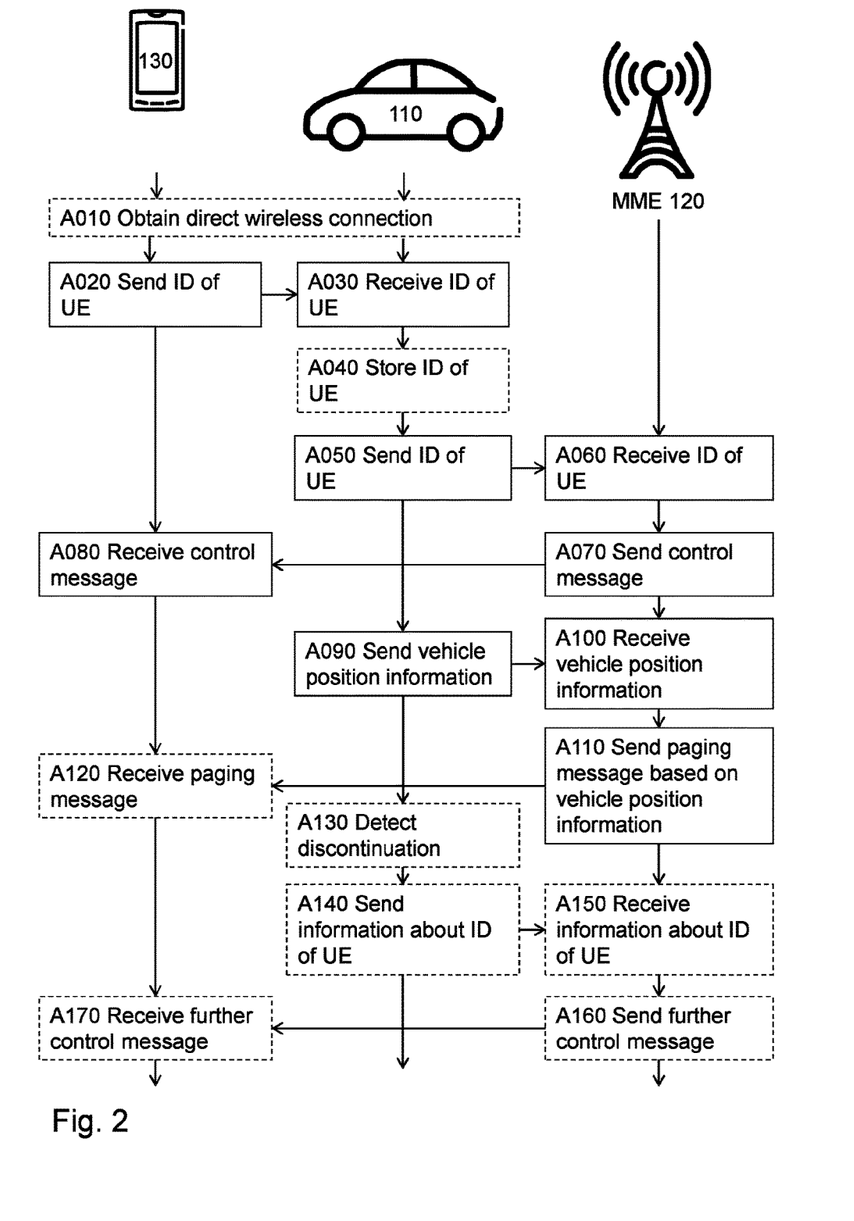
FIG. 2 is a combined signaling and flowchart illustrating the methods herein.

As a concluding remark in relation to FIG. 2, connected and autonomous vehicles, such as the vehicle 110, are expected to require very frequent information exchange with the wireless system 100 in order to ensure safety. Especially the position information of the vehicle 110 can be used to eliminate some of the non-data related transmissions required to track the location of the user equipment 130 that may be inside the vehicle 110. Examples of non-data related transmission are paging, tracking area identity, location area identity and the like.

Therefore, according to some of the embodiments above, the wireless system 100, such as the network node 120, may already be aware of e.g. trajectory and real-time location of the vehicle 110. As a result, cell association, or cell selection, and tracking of the user equipment 130 may be performed without need, or with less need, of position information from the user equipment 130 by associating the user equipment 130 with the vehicle 110 as explained above.

Figure 3:
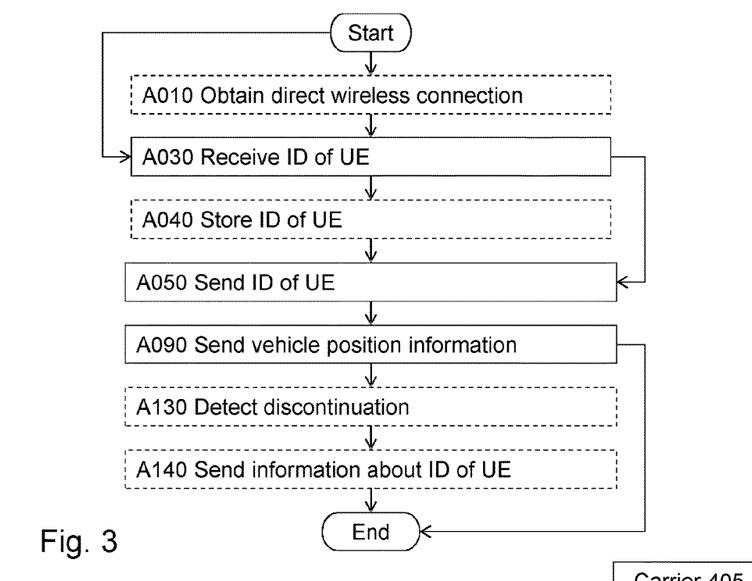
FIG. 3 is a flowchart illustrating embodiments of the method in the vehicle.

In FIG. 3, a schematic flowchart of exemplifying methods in the vehicle 110 is shown. Again, the same reference numerals as above have been used to denote the same or similar features, in particular the same reference numerals have been used to denote the same or similar actions. Accordingly, the vehicle 110 performs a method for enabling the network node 120 to manage paging of the user equipment 130, in the cellular radio access network 100.

One or more of the following actions may be performed in any suitable order.

Action A010

The vehicle 110 may obtain a direct wireless connection to the vehicle 110. See also description of the corresponding action above.

Action A030

The vehicle 110 receives, from the user equipment 130, an identification of the user equipment 130 by use of the direct wireless communication connection between the vehicle 110 and the user equipment 130, wherein the identification of the user equipment 130 relates to the cellular radio access network 100. See also description of the corresponding action above.

Action A040

The vehicle 110 may store information related to the identification of the user equipment 130. See also description of the corresponding action above.

Action A050

The vehicle 110 sends, to the network node 120 and via the cellular radio access network 100, the identification of the user equipment 130, whereby the network node 120 is made aware of that position information of the vehicle 110 is applicable to the user equipment 130 when paging the user equipment 130. See also description of the corresponding action above.

Action A090

The vehicle 110 sends, to the network node 120, the position information of the vehicle 110, whereby the network node 120, upon paging of the user equipment 130, sends a paging message, based on the position information of the vehicle 110, to the user equipment 130. See also description of the corresponding action above.

The position information of the vehicle 110 may comprise a tracking area update request or the like.

Action A130

The vehicle 110 may detect a discontinuation of the direct wireless communication connection. See also description of the corresponding action above.

Action A140

The vehicle 110 may, in response to the discontinuation, send, to the network node 120, information related to the identification of the user equipment 130, whereby the network node 120 is made aware of that the position information of the vehicle 110 is not applicable to the user equipment 130 when paging the user equipment 130. See also description of the corresponding action above.

Figure 4:
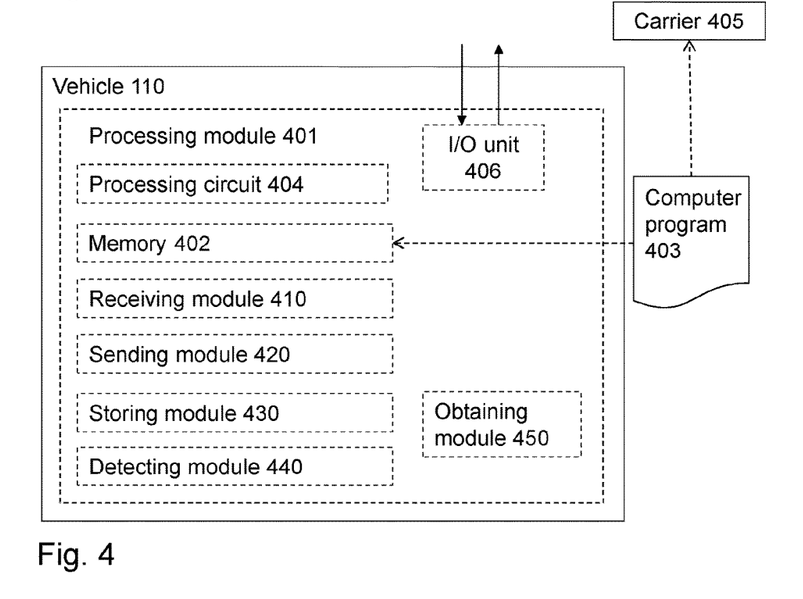
FIG. 4 is a block diagram illustrating embodiments of the vehicle.

With reference to FIG. 4, a schematic block diagram of embodiments of the vehicle 110 of FIG. 1 is shown.

The vehicle 110 may comprise a processing module 401, such as a means for performing the methods described herein. The means may be embodied in the form of one or more hardware modules and/or one or more software modules The vehicle 110 may further comprise a memory 402. The memory may comprise, such as contain or store, instructions, e.g. in the form of a computer program 403 which may comprise computer readable code units.

According to some embodiments herein, the vehicle 110 and/or the processing module 401 comprises a processing circuit 404 as an exemplifying hardware module. Accordingly, the processing module 401 may be embodied in the form of, or 'realized by', the processing circuit 404. The instructions may be executable by the processing circuit 404, whereby the vehicle 110 is operative to perform the methods of FIG. 2 and/or FIG. 3. As another example, the instructions, when executed by the vehicle 110 and/or the processing circuit 404, may cause the vehicle 110 to perform the method according to FIGS. 2 and/or 3.

FIG. 4 further illustrates a carrier 405, or program carrier, which comprises the computer program 403 as described directly above.

In some embodiments, the processing module 401 comprises an Input/Output module 406, which may be exemplified by a receiving module and/or a sending module as described below when applicable.

In further embodiments, the vehicle 110 and/or the processing module 401 may comprise one or more of a receiving module 410, a sending module 420, a storing module 430, a detecting module 440 and an obtaining module 450 as exemplifying hardware modules. In other examples, one or more of the aforementioned exemplifying hardware modules may be implemented as one or more software modules.

Accordingly, the vehicle 110 is configured for enabling the network node 120 to manage paging of the user equipment 130 in the cellular radio access network 100.

Therefore, according to the various embodiments described above, the vehicle 110 and/or the processing module 401 and/or the receiving module 410 is configured for receiving, from the user equipment 130, an identification of the user equipment 130 by use of a direct wireless communication connection between the vehicle 110 and the user equipment 130, wherein the identification of the user equipment 130 relates to the cellular radio access network 100.

Moreover, the vehicle 110 and/or the processing module 401 and/or the sending module 420 is configured for sending, to the network node 120 and via the cellular radio access network 100, the identification of the user equipment 130, whereby the network node 120 is made aware of that position information of the vehicle 110 is applicable to the user equipment 130 when paging the user equipment 130.

Furthermore, the vehicle 110 and/or the processing module 401 and/or the sending module 420, or another sending module (not shown), is configured for sending, to the network node 120, the position information of the vehicle 110, whereby the network node 120, upon paging of the user equipment 130, sends a paging message, based on the position information of the vehicle 110, to the user equipment 130.

The position information of the vehicle 110 may comprise a tracking area update request or the like.

The vehicle 110 and/or the processing module 401 and/or the storing module 430 may be configured for storing information related to the identification of the user equipment 130.

The vehicle 110 and/or the processing module 401 and/or the detecting module 440 may be configured for detecting a discontinuation of the direct wireless communication connection.

Moreover, in response to the discontinuation, the vehicle 110 and/or the processing module 401 and/or the sending module 420, or a further sending module (not shown), may be configured for sending, to the network node 120, information related to the identification of the user equipment 130, whereby the network node 120 is made aware of that the position information of the vehicle 110 is not applicable to the user equipment 130 when paging the user equipment 130.

The vehicle 110 and/or the processing module 401 and/or the obtaining module 450 may be configured for obtaining a direct wireless connection.

Figure 5:
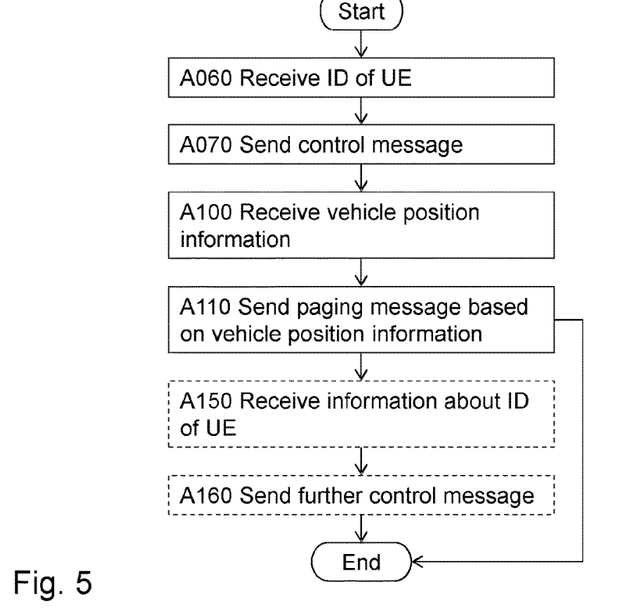
FIG. 5 is a flowchart illustrating embodiments of the method in the network node.

In FIG. 5, a schematic flowchart of exemplifying methods in the network node 120 is shown. Again, the same reference numerals as above have been used to denote the same or similar features, in particular the same reference numerals have been used to denote the same or similar actions. Accordingly, the network node 120 performs a method for managing paging of the user equipment 130 in the cellular radio access network 100, wherein the user equipment 130 is page-able by the network node 120 according to a first DRX cycle and based on position information of the user equipment 130.

One or more of the following actions may be performed in any suitable order.

Action A060

The network node 120 receives, from the vehicle 110 and via the cellular radio access network 100, an identification of the user equipment 130, wherein the identification of the user equipment 130 relates to the cellular radio access network 100. See also description of the corresponding action above.

Action A070

The network node 120 sends, to the user equipment 130, a control message instructing the user equipment 130 to apply a second DRX cycle, wherein the second DRX cycle is longer than the first DRX cycle. See also description of the corresponding action above.

Action A100

The network node 120 receives, from the vehicle 110, position information of the vehicle 110. See also description of the corresponding action above.

Action A110

The network node 120 sends, based the position information of the vehicle 110, a paging message to the user equipment 130. See also description of the corresponding action above.

Action A150

The network node 120 may receive, from the vehicle 110, information related to the identification of the user equipment 130. See also description of the corresponding action above.

Action A160

The network node 120 may send a further control message, instructing the user equipment 130 to apply the first DRX cycle. See also description of the corresponding action above.

Figure 6:
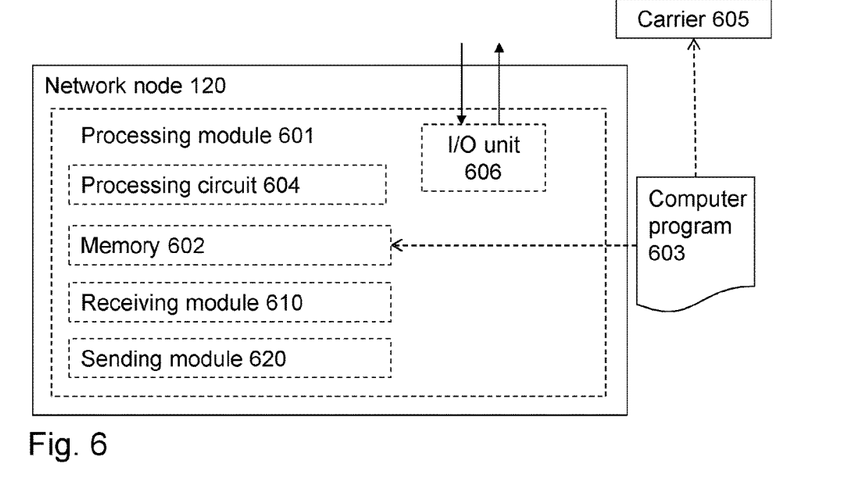
FIG. 6 is a block diagram illustrating embodiments of the network node

With reference to FIG. 6, a schematic block diagram of embodiments of the network node 120 of FIG. 1 is shown.

The network node 120 may comprise a processing module 601, such as a means for performing the methods described herein. The means may be embodied in the form of one or more hardware modules and/or one or more software modules The network node 120 may further comprise a memory 602. The memory may comprise, such as contain or store, instructions, e.g. in the form of a computer program 603 which may comprise computer readable code units.

According to some embodiments herein, the network node 120 and/or the processing module 601 comprises a processing circuit 604 as an exemplifying hardware module. Accordingly, the processing module 601 may be embodied in the form of, or 'realized by', the processing circuit 604. The instructions may be executable by the processing circuit 604, whereby the network node 120 is operative to perform the methods of FIG. 2 and/or FIG. 5. As another example, the instructions, when executed by the network node 120 and/or the processing circuit 604, may cause the network node 120 to perform the method according to FIGS. 2 and/or 5.

FIG. 6 further illustrates a carrier 605, or program carrier, which comprises the computer program 603 as described directly above.

In some embodiments, the processing module 601 comprises an Input/Output module 606, which may be exemplified by a receiving module and/or a sending module as described below when applicable.

In further embodiments, the network node 120 and/or the processing module 601 may comprise one or more of a receiving module 610, and a sending module 620 as exemplifying hardware modules. In other examples, one or more of the aforementioned exemplifying hardware modules may be implemented as one or more software modules.

Accordingly, the network node 120 is configured for managing paging of the user equipment 130 in the cellular radio access network 100. As mentioned, the user equipment 130 is page-able by the network node 120 according to a first DRX cycle and based on position information of the user equipment 130.

Therefore, according to the various embodiments described above, the network node 120 and/or the processing module 601 and/or the receiving module 610 is configured for receiving, from the vehicle 110 and via the cellular radio access network 100, an identification of the user equipment 130, wherein the identification of the user equipment 130 relates to the cellular radio access network 100.

Moreover, the network node 120 and/or the processing module 601 and/or the sending module 620 is configured for sending, to the user equipment 130, a control message instructing the user equipment 130 to apply a second DRX cycle, wherein the second DRX cycle is longer than the first DRX cycle.

Furthermore, the network node 120 and/or the processing module 601 and/or the receiving module 610, or another receiving module (not shown), is configured for receiving, from the vehicle 110, position information of the vehicle 110.

The network node 120 and/or the processing module 601 and/or the sending module 620, or another sending module (not shown), is also configured for sending, based the position information of the vehicle 110, a paging message to the user equipment 130.

The network node 120 and/or the processing module 601 and/or the receiving module 610, or a further receiving module (not shown), may be configured for receiving, from the vehicle 110, information related to the identification of the user equipment 130.

Furthermore, the network node 120 and/or the processing module 601 and/or the sending module 620, or a further sending module (not shown), may be configured for sending a further control message, instructing the user equipment 130 to apply the first DRX cycle.

Figure 7:
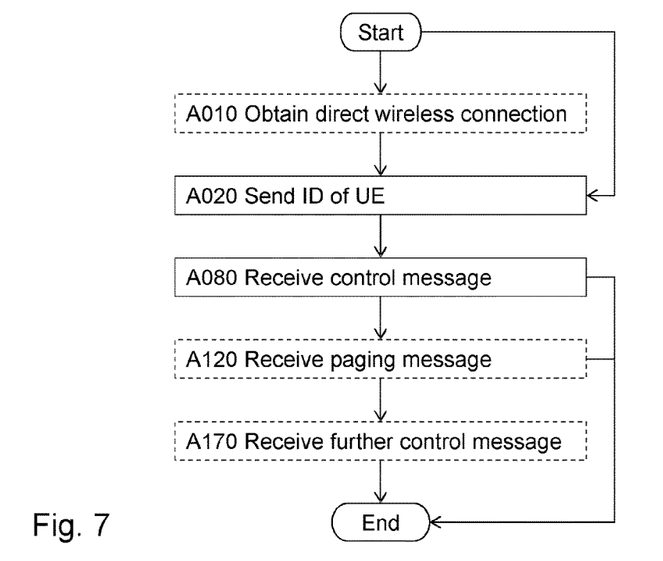
FIG. 7 is a flowchart illustrating embodiments of the method in the user equipment.

In FIG. 7, a schematic flowchart of exemplifying methods in the user equipment 130 is shown. Again, the same reference numerals as above have been used to denote the same or similar features, in particular the same reference numerals have been used to denote the same or similar actions. Accordingly, the user equipment 130 performs a method for enabling the vehicle 110 to enable the network node 120 to manage paging of the user equipment 130 in the cellular radio access network 100.

As mentioned, the user equipment 130 is page-able by the network node 120 according to a first DRX cycle.

One or more of the following actions may be performed in any suitable order.

Action A010

The user equipment 130 may obtain a direct wireless connection. See also description of the corresponding action above.

Action A020

The user equipment 130 sends, to the vehicle 110, an identification of the user equipment 130 by use of the direct wireless communication connection, wherein the identification of the user equipment 130 relates to the cellular radio access network 100. See also description of the corresponding action above.

Action A080

The user equipment 130 receives, from the network node 120, a control message, instructing the user equipment 130 to apply a second DRX cycle, wherein the second DRX cycle is longer than the first DRX cycle. See also description of the corresponding action above.

Action A120

The user equipment 130 may receive, a paging message from the network node 120. See also description of the corresponding action above.

Figure 8:
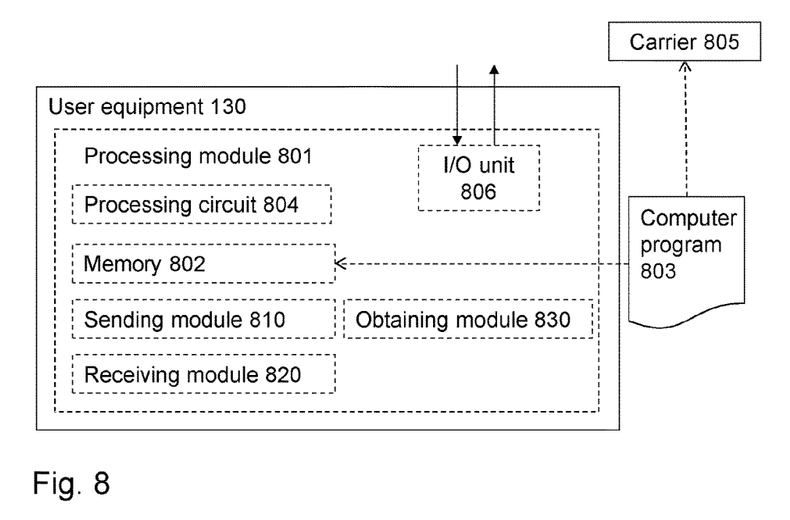
FIG. 8 is a block diagram illustrating embodiments of the user equipment.

With reference to FIG. 8, a schematic block diagram of embodiments of the user equipment 130 of FIG. 1 is shown.

The user equipment 130 may comprise a processing module 801, such as a means for performing the methods described herein. The means may be embodied in the form of one or more hardware modules and/or one or more software modules The user equipment 130 may further comprise a memory 802. The memory may comprise, such as contain or store, instructions, e.g. in the form of a computer program 803, which may comprise computer readable code units.

According to some embodiments herein, the user equipment 130 and/or the processing module 801 comprises a processing circuit 804 as an exemplifying hardware module. Accordingly, the processing module 801 may be embodied in the form of, or 'realized by', the processing circuit 804. The instructions may be executable by the processing circuit 804, whereby the user equipment 130 is operative to perform the methods of FIG. 2 and/or FIG. 7. As another example, the instructions, when executed by the user equipment 130 and/or the processing circuit 804, may cause the user equipment 130 to perform the method according to FIGS. 2 and/or 7.

FIG. 8 further illustrates a carrier 805, or program carrier, which comprises the computer program 803 as described directly above.

In some embodiments, the processing module 801 comprises an Input/Output module 806, which may be exemplified by a receiving module and/or a sending module as described below when applicable.

In further embodiments, the user equipment 130 and/or the processing module 801 may comprise one or more of a sending module 810, a receiving module 820, and an obtaining module 830 as exemplifying hardware modules. In other examples, one or more of the aforementioned exemplifying hardware modules may be implemented as one or more software modules.

Accordingly, the user equipment 130 is configured for enabling the vehicle 110 to enable the network node 120 to manage paging of the user equipment 130 in the cellular radio access network 100. As mentioned, the user equipment 130 is page-able by the network node 120 according to a first DRX cycle.

Therefore, according to the various embodiments described above, the user equipment 130 and/or the processing module 801 and/or the sending module 810 is configured for sending, to the vehicle 110, an identification of the user equipment 130 by use of a direct wireless communication connection, wherein the identification of the user equipment 130 relates to the cellular radio access network 100.

Moreover, the user equipment 130 and/or the processing module 801 and/or the receiving module 820 is configured for receiving, from the network node 120, a control message, instructing the user equipment 130 to apply a second DRX cycle, wherein the second DRX cycle is longer than the first DRX cycle.

The user equipment 130 and/or the processing module 801 and/or the receiving module 820 may be configured for receiving, a paging message from the network node 120.

The user equipment 130 and/or the processing module 801 and/or the obtaining module 830 may be configured for obtaining a direct wireless connection.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "program carrier", or "carrier", may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a vehicle in communication with a network node and a user equipment operating in a cellular radio access network, wherein the method comprises:

receiving, from the user equipment, an identification of the user equipment by use of a direct wireless communication connection between the vehicle and the user equipment, wherein the identification of the user equipment relates to the cellular radio access network, sending, to the network node and via the cellular radio access network, a message comprising the identification of the user equipment, wherein the message includes an indication that explicitly instructs the network node to send a control message instructing the user equipment to apply a second Discontinuous Reception (DRX) cycle, wherein the second DRX cycle is longer than a first DRX cycle of the user equipment, and sending, to the network node via the cellular radio access network, position information of the vehicle.

2. The method according to claim 1, wherein the method comprises:

storing information related to the identification of the user equipment; and wherein the message causes the network node, upon paging of the user equipment, to send a paging message, based on the position information of the vehicle, to the user equipment.

3. The method according to claim 1, wherein sending the position information comprises sending, to the network node via the cellular radio access network, the position information in a tracking area update request.

4. The method according to claim 1, wherein the method comprises:

detecting a discontinuation of the direct wireless communication connection, and in response to the discontinuation, sending, to the network node, information related to the identification of the user equipment that informs the network node that the position information of the vehicle is not applicable to the user equipment when paging the user equipment.

5. A method, performed by a network node, for managing paging of a user equipment in a cellular radio access network, wherein the user equipment is page-able by the network node according to a first DRX cycle and based on position information of the user equipment, wherein the method comprises:

receiving, from a vehicle and via the cellular radio access network, a message that comprises an identification of the user equipment, wherein the identification of the user equipment relates to the cellular radio access network, responsive to receiving the message, sending, to the user equipment, a control message instructing the user equipment to apply a second DRX cycle, wherein the second DRX cycle is longer than the first DRX cycle, receiving, from the vehicle and via the cellular radio access network, position information of the vehicle, and responsive to sending the control message and receiving the position information, sending, based on the position information of the vehicle, a paging message to the user equipment.

6. The method according claim 5, wherein the method comprises:

receiving, from the vehicle, information related to the identification of the user equipment that informs the network node that the position information of the vehicle is not applicable to the user equipment when paging the user equipment, and responsive to receiving the information related to the identification of the user equipment that informs the network node that the position information of the vehicle is not applicable to the user equipment, sending a further control message to the user equipment, instructing the user equipment to apply the first DRX cycle.

7. A method, performed by a user equipment, for enabling a vehicle to enable a network node to manage paging of the user equipment in a cellular radio access network, wherein the user equipment is page-able by the network node according to a first Discontinuous Reception (DRX) cycle, wherein the method comprises:
  sending, to the vehicle, an identification of the user equipment by use of a direct wireless communication connection between the user equipment and the vehicle, wherein the identification of the user equipment relates to the cellular radio access network,
  responsive to sending the identification of the user equipment to the vehicle, receiving, from the network node, a control message, instructing the user equipment to apply a second DRX cycle, wherein the second DRX cycle is longer than the first DRX cycle, and
  responsive to receiving the control message, receiving a paging message from the network node based on the second DRX cycle.

8. The method according to claim 7, wherein the method comprises:
  discontinuing direct wireless communication with the vehicle; and
  responsive to discontinuing direct wireless communication with the vehicle, receiving a further control message, from the network node, instructing the user equipment to apply the first DRX cycle.

9. A vehicle that communicates with a network node and a user equipment operating in a cellular radio access network, the vehicle comprising:
  a processing circuit; and
  memory comprising instructions executable by the processing circuit whereby the vehicle is operative to:
  receive, from the user equipment, an identification of the user equipment by use of a direct wireless communication connection between the vehicle and the user equipment, wherein the identification of the user equipment relates to the cellular radio access network,
  send, to the network node and via the cellular radio access network, a message comprising the identification of the user equipment, wherein the message includes an indication that explicitly instructs the network node to send a control message instructing the user equipment to apply a second Discontinuous Reception (DRX) cycle, wherein the second DRX cycle is longer than a first DRX cycle of the user equipment, and
  send, to the network node via the cellular radio access network, position information of the vehicle.

10. The vehicle according to claim 9, wherein the vehicle is further operative to:
  store information related to the identification of the user equipment; and
  wherein the message causes the network node, upon paging of the user equipment, to send a paging message, based on the position information of the vehicle, to the user equipment.

11. The vehicle according to claim 9, wherein the position information of the vehicle comprises a tracking area update request.

12. The vehicle according claim 9, whereby the vehicle is further operative to:
  detect a discontinuation of the direct wireless communication connection, and,
  in response to the discontinuation, send, to the network node, information related to the identification of the user equipment that informs the network node that the position information of the vehicle is not applicable to the user equipment when paging the user equipment.

13. A network node configured for managing paging of a user equipment in a cellular radio access network, wherein the user equipment is page-able by the network node according to a first DRX cycle and based on position information of the user equipment, the network node comprising:
  a processing circuit; and
  memory comprising instructions executable by the processing circuit whereby the network node is operative to:
  receive, from a vehicle and via the cellular radio access network, a message that comprises an identification of the user equipment, wherein the identification of the user equipment relates to the cellular radio access network,
  responsive to the reception of the message, send, to the user equipment, a control message instructing the user equipment to apply a second DRX cycle, wherein the second DRX cycle is longer than the first DRX cycle,
  receiving, from the vehicle and via the cellular radio access network, position information of the vehicle, and
  responsive to sending the control message and receiving the position information, send, based on the position information of the vehicle, a paging message to the user equipment.

14. The network node according to claim 13, whereby the network node further operative to:
  receive, from the vehicle, information related to the identification of the user equipment and that informs the network node that the position information of the vehicle is not applicable to the user equipment when paging the user equipment, and
  responsive to the reception of the information related to the identification of the user equipment that informs the network node that the position information of the vehicle is not applicable to the user equipment when paging the user equipment, send a further control message, instructing the user equipment to apply the first DRX cycle.

15. A user equipment configured for enabling a vehicle to enable a network node to manage paging of the user equipment in a cellular radio access network, wherein the user equipment is page-able by the network node according to a first DRX cycle, the user equipment comprising:
  a processing circuit; and
  memory comprising instructions executable by the processing circuit whereby the user equipment is operative to:
  send, to the vehicle, an identification of the user equipment by use of a direct wireless communication connection, wherein the identification of the user equipment relates to the cellular radio access network,
  responsive to sending the identification of the user equipment to the vehicle, receive, from the network node, a control message, instructing the user equipment to apply a second DRX cycle, wherein the second DRX cycle is longer than the first DRX cycle, and
  responsive to receiving the control message, receive a paging message from the network node based on the second DRX cycle.

16. A computer program product comprising a non-transitory computer readable medium including computer readable code which when executed on a vehicle causes the vehicle to perform the method according to claim 1.

17. A computer program product comprising a non-transitory computer readable medium including computer readable code which when executed on a network node causes the network node to perform the method according to claim 5.

18. A computer program product comprising a non-transitory computer readable medium including computer readable code which when executed on a user equipment causes the user equipment to perform the method according to claim 7.

\* \* \* \* \*